United States Patent
Lampert et al.

(10) Patent No.: US 6,250,817 B1
(45) Date of Patent: Jun. 26, 2001

(54) DEVICE THAT ATTACHES TO THE BOOT OF AN OPTICAL FIBER SIMPLEX CONNECTOR TO PROVIDE THE CONNECTOR WITH ANTI-SNAGGING AND/OR POLARITY IDENTIFICATION FEATURES

(75) Inventors: Norman Roger Lampert, Norcross; Elizabeth J. Driscoll, Atlanta; Troy Barry Mock, Lawrenceville, all of GA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/420,683

(22) Filed: Oct. 19, 1999

(51) Int. Cl.⁷ ........................................................ G02B 6/38
(52) U.S. Cl. ................................ 385/56; 385/76; 385/78; 385/137
(58) Field of Search ................................ 385/53, 55, 56, 385/59, 66, 70, 71, 76, 78, 136, 137, 139; 439/660, 676

(56) References Cited

U.S. PATENT DOCUMENTS

| | | | |
|---|---|---|---|
| 5,538,438 | 7/1996 | Orlando | 439/344 |
| 5,574,812 * | 11/1996 | Beier et al. | 385/78 |
| 5,579,425 | 11/1996 | Lampert et al. | 385/59 |
| 5,638,474 * | 6/1997 | Lampert et al. | 385/78 |
| 5,647,043 * | 7/1997 | Anderson et al. | 385/78 |

\* cited by examiner

*Primary Examiner*—Darren Schuberg
(74) *Attorney, Agent, or Firm*—Thomas, Kayden, Horstemeyer & Risley, LLP (57) ABSTRACT

A device adapted to be attached to the buffer adapter, also known as the boot, of an optical fiber simplex connector to provide the connector with ant-snagging characteristics and/or to enable the polarity of an optical fiber cable terminated by the connector to be ascertained. In accordance with the preferred embodiment, the device is a duplex clip that comprises a clip body that is adapted to receive and grip the outer surfaces of the boots of a pair of simplex connectors to hold the simplex connectors in close spatial proximity to one another to thereby form a duplex connector. Two generally cylindrical bores are formed in the clip body and the inner surfaces of the bores are adapted to grip the outer surfaces of the boots. Slots are formed in the clip body to provide the bores with generally C-shaped cross-sections. Cables can be passed through the slots to enable the clip to be attached to a pair of simplex connectors when the simplex connectors are either coupled to or decoupled from a receptacle or adapter. The duplex clip has markings thereon that enable the polarity of the cables held in the clip to be easily ascertained.

18 Claims, 5 Drawing Sheets

DEVICE THAT ATTACHES TO THE BOOT OF AN OPTICAL FIBER SIMPLEX CONNECTOR TO PROVIDE THE CONNECTOR WITH ANTI-SNAGGING AND/ OR POLARITY IDENTIFICATION FEATURES

TECHNICAL FIELD OF THE INVENTION

The present invention relates to optical fiber connectors and, more particularly, to a device that attaches to the buffer adapter, also known as the boot, of an optical fiber simplex connector to provide the connector with anti-snagging characteristics and/or to enable the polarity of an optical fiber cable terminated by the connector to be ascertained.

BACKGROUND OF THE INVENTION

In networks and communication equipment that utilize optical fibers, it is frequently desirable to make a connection with a pair of optical fibers and to ensure that the connections have been made correctly. For example, it is important to ensure that a transmitting optical fiber is connected to the transmitter port of a transceiver and that the receive optical fiber is connected to the receiver port of the transceiver. Similarly, it is important that when a pair of transmit and receive optical fibers are to be connected to another pair of transmit and receive optical fibers, the correct optical fibers of each of the pairs are connected together, or optically coupled at their ends. Otherwise, an end of a transmit optical fiber of one pair may be connected to an end of a receive optical fiber of the other pair, which, for obvious reasons, is unacceptable. Properly orienting the optical fibers in this manner ensures that the optical fibers are connected with the proper polarity.

Duplex optical connectors have been utilized in the communications industry to couple two simplex optical fibers together in a duplex arrangement to allow both optical fibers to be simultaneously connected to ports located on communication equipment or to an adapter that connects pairs of optical fibers together. For example, U.S. Pat. No. 4,787,706 discloses a duplex optical fiber connector for terminating a cable containing a pair of buffered optical fibers. Each of the optical fibers is held within a fiber-holding assembly comprising a ferrule and a spring-loaded base member. The fiber-holding assemblies are contained within a common housing that is formed to include two flexible molded plastic side arm members for interlocking with a mating receptacle. The housing includes details that can be used to ensure that when the optical fiber connector is connected with another optical fiber connector, the connection is made with the proper polarity.

Figure 1:
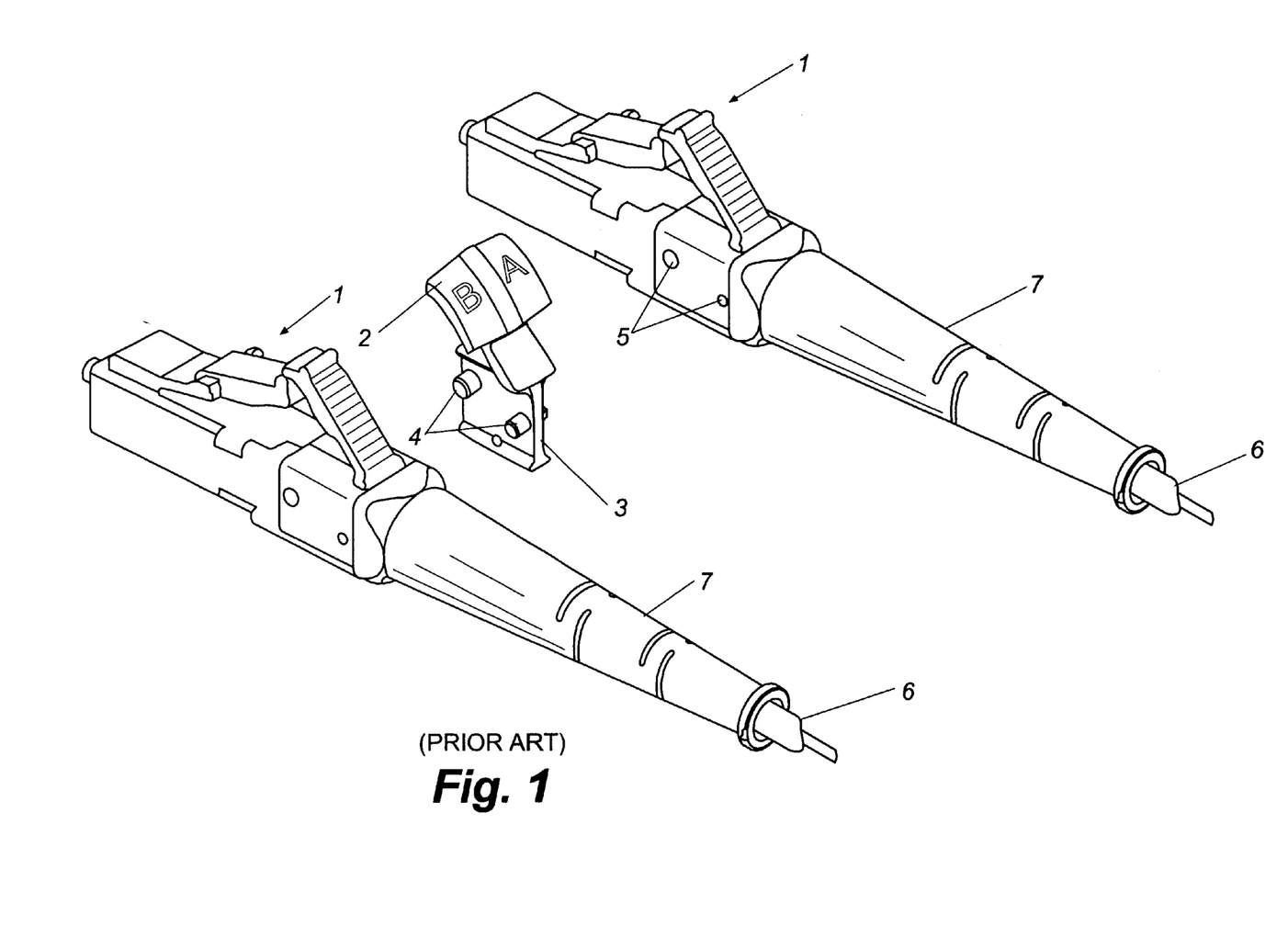
FIG. 1 is a perspective view of a prior art duplex connector being clipped together via a duplex clip to form a duplex connector.

U.S. Pat. No. 5,579,425 (hereinafter the '425 patent) also discloses an optical fiber duplex connector, which is shown in FIG. 1. The duplex connector is constructed by joining together a pair of simplex connectors 1 with a plastic clip 2. Each clip 2 includes a first planar structure 3 having a pair of cylindrical pins 4 of different diameters thereon, which are press fit into associated openings 5 formed in the simplex connectors 1 to thereby connect them together. The plastic clip 2 has information thereon, such as the letters A and B, that may be utilized by a user to identify the correct polarization of the duplex connector with respect to an adapter (not shown) into which it is plugged.

Although the plastic clip disclosed in the '425 patent is suitable for use with the type of simplex connectors shown in FIG. 1, which are normally connected to the front side of a connector receptacle or adapter, this clip 2 is not suitable for use with behind-the-wall (BTW) connectors. BTW connectors are connected on the back side, commonly referred to as the junior side, of the receptacle or adapter where there is typically very little room. The confined area dictates that the simplex connectors and the boots associated therewith generally be shorter in length than the boots 7 of the cables 6 that are used with the simplex connectors 1 in front side mounting configurations.

On the front side of the connector receptacle or adapter, there generally is plenty of space and the length of the connector 1 and the boot 7, which is also referred to as a cable support, is not an issue. Therefore, the plastic clip 2 disclosed in '425 patent, which connects to the housings of the connectors 1, is suitable for use in this type of environment since the lengths of the housings normally are sufficiently long to accommodate connection with the clip 2 at locations near the back ends of the housings. However, this generally is not true with respect to connectors used in BTW configurations.

Figures 2, 3:
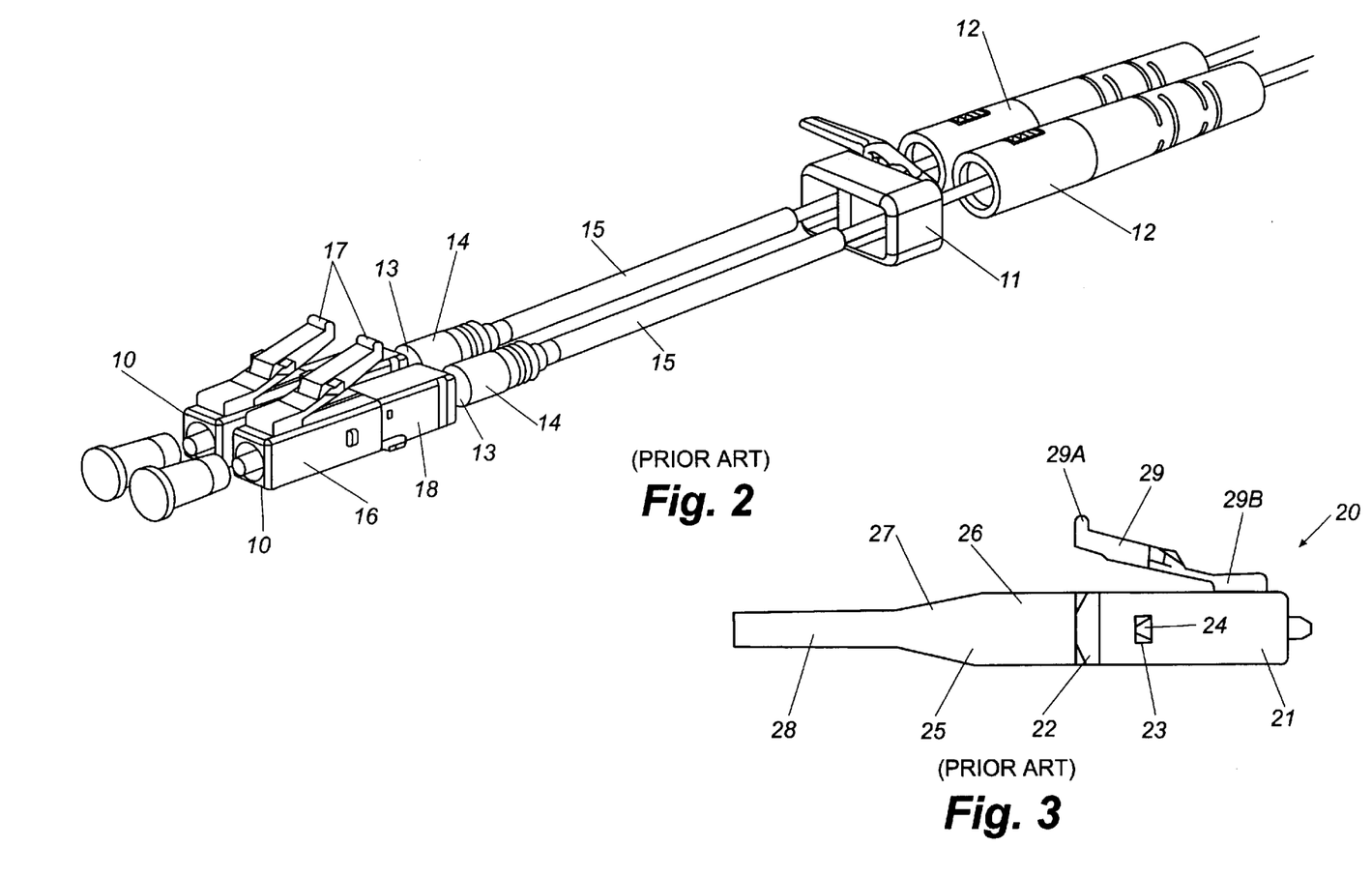
FIG. 2 is a perspective view of a prior art duplex connector being clipped together via a duplex yoke to form a duplex connector.
FIG. 3 is a side view of a prior art simplex connector that is designed to be used in a behind-the-wall (BTW) application.

FIG. 2 illustrates another known optical fiber duplex connector. The duplex connector shown in FIG. 2 comprises two connectors 10 that are clipped together by a duplex yoke 11, which attaches near the back ends of the connector housings. Once the duplex yoke 11 has been attached, end portions of two strain relief boots 12 are pushed over crimp cans 13 extending from the back ends of the connector housings. Heat-fit tubing 14 is attached to the fiber cable 15 and to the ends of the crimp cans 13. The cable 15 is typically 1.6 millimeters (mm) in diameter, although cables having other diameters with or without heat-fit tubing can be utilized. Each of the connectors 10 is comprised of a two-piece housing. The front portion 16 of the housing has a latch 17 thereon and houses the ferrule assembly (not shown) that holds the end of the optical fiber. The back portion 18 of the housing contains a metal insert (not shown) that assists the connector in handling side loading. The optical fiber cable 15 contains aramid fiber strength members that are crimped to the metal insert.

As with the duplex connector of the '425 patent, the duplex yoke 11 attaches to the connector housings and forms an anti-snag trigger to assist in decoupling the connection. The housings of the connectors 10 are sufficiently long to enable the yoke 11 to be attached to them because the connectors 10 require the back portions 18 of the housings, which contain the metal inserts that provide the connectors 10 with sufficient side loading capability. As with the duplex connector of the '425 patent, the duplex connector shown in FIG. 2 normally is used on the front side of receptacles or adapters rather than on the junior side. Connectors utilized on the front side normally must have greater strain relief and side loading capability, since they are normally disposed in environments where they are susceptible to greater bending forces and typically use larger cordage. Therefore, these jumper connectors typically are longer than BTW connectors due to the insertion of a metal insert that is used for transferring cable loads to the connector. Longer connector plug housings provide surfaces that enable the connector housings to be clipped together by a duplex yoke that attaches to the connector housings. However, the duplex yoke shown in FIG. 2 and known simplex yokes are not suitable for use with BTW connectors typically connected on the junior side of an adapter or device receptacle in BTW mounting arrangements for the same reasons that the duplex clip of the '425 patent is not suitable for use in such arrangements.

FIG. 3 is a side view of an optical connector that is typically used in a BTW configuration and which is suitable for use with the duplex clip of the present invention. The connector 20 shown in FIG. 3 comprises a plug body 21 and a rear extender cap 22. The plug body 21 has keyways 23—23 formed in opposite sides thereof. The rear extender cap 22 has keys 24—24 disposed on opposite sides thereof. The plug body 21 is coupled to the extender cap 22 by snapping the keys 24—24 located on each side of the plug body 21 inside of the keyways 23—23 formed on each side of the extender cap 22. The extender cap 22 is coupled to a buffer adapter 25, or boot, which protects a buffered optical fiber (not shown). The boot 25 is comprised of a wide cylindrical portion 26, which fits over an end of the extender cap 22, a tapered cylindrical portion 27, which resists side pulling and ensures a proper minimum bend radius, and a narrow cylindrical portion 28, which protects the buffered fiber from kinking that might otherwise result from light side-pulling forces. The plug body 21 has a latch 29 molded thereon that enables the connector 20 to be coupled to and decoupled from a receptacle or adapter.

The connector 20 shown in FIG. 3 is typically considerably shorter in length than the two-piece connectors 1 and 10 shown in FIGS. 1 and 2, respectively, which makes the connector 20 suitable for use in BTW configurations. It would be desirable to provide a clip that is capable of duplexing two simplex connectors of the type shown in FIG. 3 together to form a duplex connector. However, due to the relatively short length of the housing of the connector 20, a clip is needed that is capable of coupling two shorter simplex connectors together to form a duplex connector. A need also exists for such a clip that also has an anti-snag feature that prevents the latches of the simplex connectors from fish-hooking when they are being removed from a connection location.

In BTW mounting configurations, the connectors that terminate the ends of the receive and transmit optical fibers must be connected to the receive and transmit ports located in the junior side of a receptacle or adapter. Therefore, the receive and transmit optical fibers must be correctly polarized on the junior side of the housing in the same manner in which the receive and transmit optical fibers must be correctly polarized on the front side of the receptacle or adapter. However, currently there is no aid for assisting a user or technician in determining the polarity of the optical fibers connected on the junior side. Therefore, once the transmit and receive optical fibers have been connected to the ports on the junior side, if a user removes one or both of the optical fibers from their respective ports, the user must somehow keep track of which simplex connector is to be connected to which port in order to ensure that the connectors are properly polarized when they are re-connected to the transmit and receive ports.

It would be desirable to provide a duplex clip that converts two simplex connectors into a duplex connector for use in cases where there is very little room to work with the connectors and/or in cases where the housings of the connectors are too short to enable the housings to be coupled together to form a duplex connector. For example, with respect to the connector 20 shown in FIG. 3, once the connector 20 has been inserted into an associated adapter or receptacle, most of the body of the connector 20 is contained within the adapter or receptacle. The portion of the connector body that is not contained in the adapter or receptacle generally is insufficient to enable a duplex clip to be attached thereto for the purpose of clipping two of the connectors together to form a duplex connector.

Accordingly, a need exists for a duplex clip that is capable of clipping two simplex connectors together to form a duplex connector, which is suitable for use with connectors used in BTW configurations and in other confined areas, which provides an anti-snag mechanism that prevents the simplex connectors from fish-hooking when the simplex connectors are being removed from a connection location and which helps a user to easily determine the polarity of the connectors.

SUMMARY OF THE INVENTION

The present invention provides a device that attaches to the buffer adapter, also known as the boot, of an optical fiber simplex connector to provide the connector with anti-snagging characteristics and/or to enable the polarity of an optical fiber cable terminated by the connector to be ascertained. The device generally is a clip having a clip body that is adapted to receive and hold the boot of an optical fiber simplex connector. The clip body has a trigger thereon that is in contact with the latch of the simplex connector when the simplex connector is held in the clip body. When a user depresses the trigger, the trigger depresses the latch and causes the simplex connector to be decoupled from an adapter or receptacle. The trigger prevents the latch from snagging on objects, or "fish-hooking", when the simplex connector is being moved.

In accordance with the preferred embodiment, the device is a duplex clip that comprises a clip body that is adapted to receive and grip the outer surfaces of the boots of a pair of simplex connectors to hold the simplex connectors in close spatial proximity to one another to thereby form a duplex connector. Two generally cylindrical bores are formed in the clip body and the inner surfaces of the bores are adapted to grip the outer surfaces of the boots. Slots are formed in the clip body to provide the bores with generally C-shaped cross-sections. Cables can be passed through the slots to enable the clip to be attached to a pair of simplex connectors when the simplex connectors are is in contact with the latches of the simplex connectors when the simplex connectors are held by the clip. The clip has markings thereon, which preferably are located on the trigger, that enable the polarity of the cables held in the clip to be easily ascertained.

In accordance with another embodiment, the clip is adapted to receive and grip the outer surface of the boot of a single simplex connector. A generally cylindrical bore is formed in the clip body and the inner surface of the bore is adapted to grip the outer surface of the boot. A slot is formed in the clip body to provide the bore with a generally C-shaped cross-section. A cable can be passed through the slot to enable the clip to be attached to a simplex connector when the simplex connector is coupled to or decoupled from a receptacle or adapter. The clip has a trigger thereon that is in contact with the latch of the simplex connector when the simplex connector is held by the clip. The trigger allows a user to easily decouple the connector from an adapter or receptacle and provides the connector with the aforementioned anti-snagging feature.

These and other features and advantages of the present invention will become apparent from the following description, drawings and claims.

DETAILED DESCRIPTION OF THE INVENTION

In accordance with the preferred embodiment of the present invention, the clip of the present invention is a duplex clip adapted for clipping two simplex optical fiber connectors together to form a duplex connector. However, the clip of the present invention may be configured to clip more than two simplex optical fiber connectors together to form a quad connector or some other "multiplex" connector. On the other hand, the clip of the present invention may be configured to clip to a single simplex optical fiber connector, as discussed below in detail. Therefore, it should be understood that the present invention is not limited to the duplex clip discussed herein in detail with reference to FIGS. 4A–8B.

Figure 4A:
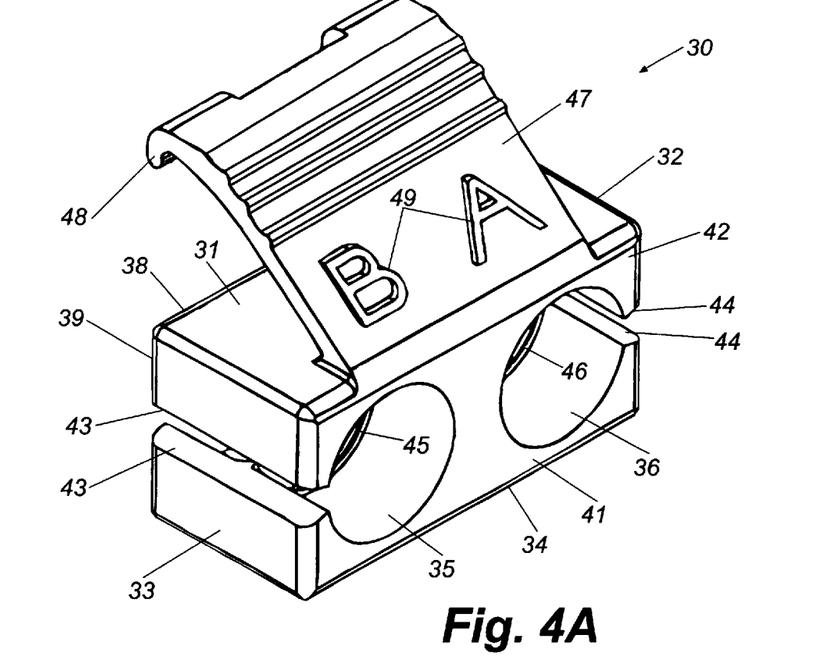
FIG. 4A is an elevated top, perspective view of the duplex clip of the present invention in accordance with the preferred embodiment.
Figure 4B:
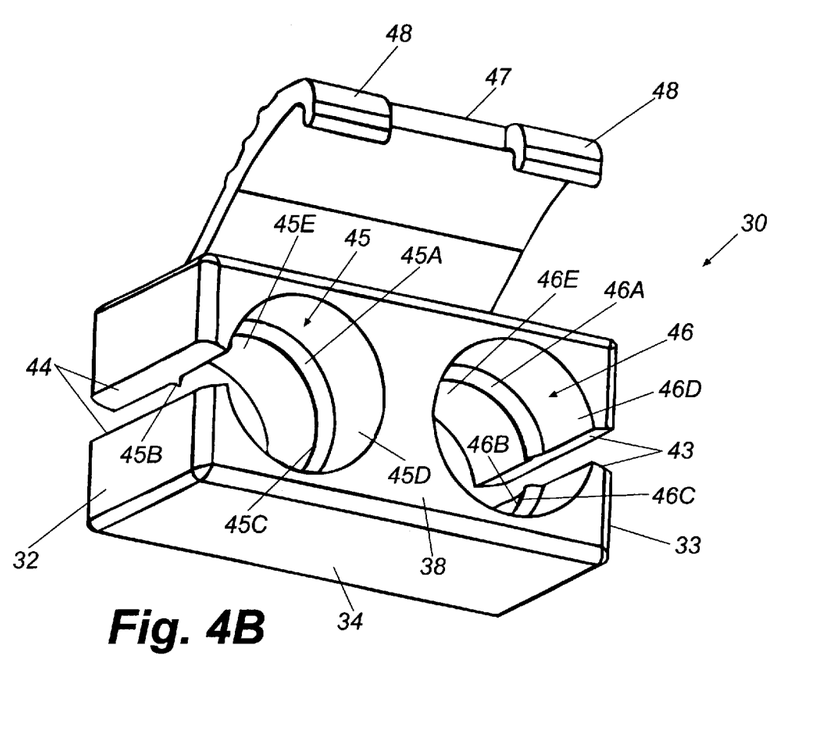
FIG. 4B is an elevated side, perspective view of the duplex clip of the present invention shown in FIG. 4A.

FIG. 4A is an elevated top, perspective view of the duplex clip 30 of the present invention in accordance with the preferred embodiment. FIG. 4B is a side, perspective view of the duplex clip 30 of the present invention in accordance with the preferred embodiment. The manner in which the duplex clip 30 is used to clip two optical fiber cables together to form a duplex connector will be described with reference to its use with the cable boot 25 and connector 20 shown in FIG. 3. The duplex clip 30 preferably has a generally rectangular shape defined by a top surface 31, two side surfaces 32 and 33 and a bottom surface 34. The duplex clip 30 has two cylindrically-shaped bores 35 and 36 formed therein, which are adapted to grip the boot 25, also commonly referred to as a buffer adapter, disposed on the end of the optical fiber cable, as shown in FIG. 3. The cylindrically-shaped bores 35 and 36 each have a circumferential "ramped" ridge such that the diameter of the bores decreases in a direction from the flat surface 38 of the forward side 39 of the duplex clip 30 toward the flat surface 41 of the rear end 42 of the duplex clip 30. The bores 35 and 36 are generally C-shaped with slots 43—43 and 44—44 formed by surfaces 43 and 44 to enable an optical fiber cable to be passed through the slots 43—43 and 44—44.

The slots 43—43 and 44—44 allow the duplex clip 30 to be installed on the boots of optical fiber cables that are already connected by simplex connectors to an adapter or receptacle. The duplex clip 30 is easily installed by a user by simply passing the cables through the slots 43—43 and 44—44 and by pushing the duplex clip 30 forward toward the simplex connectors until the boots of the cables are snugly held within the bores 35 and 36 of the duplex clip 30. Therefore, the duplex clip 30 can be installed in such a manner that the polarity of the optical fiber cables attached to the receptacle or housing is maintained while the clip 30 is being installed.

In addition to providing the clip 30 with passageways for passing the optical fiber cables into the bores 35 and 36 of the clip 30, the slots 43—43 and 44—44 also enable the clip 30 to be pinched with the user's thumb and finger when the duplex connector is being decoupled from a receptacle or adapter, which causes the grip of the bores 35 and 36 on the boots to be temporarily tightened. This additional gripping force further ensures that the clip 30 will not be pulled away from the boots 25 of the cables when the user attempts to decouple the duplex connector from the receptacle or adapter. As the user grips the clip 30 to decouple it from the receptacle or adapter, the user depresses the latches 29 of the connectors 20 with his or her thumb, which causes the connectors 20 to be decoupled from the receptacle or adapter.

It should be noted that it is not necessary that the slots 43—43 and 44—44 be located in the side surfaces 32 and 33 of the clip 30. The slots 43—43 and 44—44 could instead be located in the top or bottom surfaces 31 and 34, respectively, of the clip 30. Those skilled in the art will understand the manner in which these and other modifications may be made to the clip shown in FIGS. 4A and 4B and that all such modifications are within the scope of the present invention.

The ridges 45 and 46 located on the inner surfaces of the bores 35 and 36, respectively, can be more clearly seen with respect to the elevated side, perspective view shown in FIG. 4B. The side shown in FIG. 4B is the flat side 38 of the forward end 39 of the duplex clip 30. The ridges 45 and 46 are circumferential and are located approximately mid-span within the bores 35 and 36, respectively. The ridge 45 is defined by ramping surface 45A and stop surface 45B. The ridge 46 is defined by ramping surface 46A and by stop surface 46B. The surfaces 45C and 46C define the smallest diameters of the bores 35 and 36, respectively. The surfaces 45D/45E and 46D/46E define the largest diameters of the bores 35 and 36, respectively. The surfaces 45A/45B45C and 46A/46B/46C are transitional surfaces between surfaces 45D/45E and 46D/46E, respectively.

As the clip 30 is moved in the forward direction over the narrow ends 28 of the boots 25 toward the wider ends 26 of the boots 25, the surfaces 45D and 46D grip the boots 25 about the wider portions 26 of the boots 25 and the surfaces 45E and 46E grip the boots about the portions 26 of the boots 25 just forward of the tapered portions 27 of the boots 25 where the boots 25 are slightly narrower maintained in substantially fixed positions within the openings 25 and 26 via a friction fit. This friction fit, while maintaining the boots 25 of the optical fiber cables in substantially fixed positions within the bores 35 and 36, allows some degree of "float" of the simplex connectors 20 to allow the connectors 20 to be easily connected to an associated adapter, such as that discussed below with reference to FIG. 7.

It should be noted that it is not necessary that the inner surfaces of the bores 35 and 36 have the ridges 45 and 46 formed therein. Rather, the surfaces of the bores 35 and 36 could be provided with a uniform diameter over the entire surfaces. The ridges 45 and 46 are preferred because they tend to optimize the gripping of the boots 25 since the outer diameter of the boots 25 is not uniform over the entire surfaces of the boots 25, as seen in FIG. 3.

The gripping of the boot 25 by the surfaces of the bores 35 and 36 does not exert sufficient force on the boot 25 to cause the boot 25 to pinch the buffered fiber. Also, as discussed in more detail below with reference to FIG. 5, a portion of the extender cap 22 disposed within the wider portion 26 of the boot 25 prevents the boot 25 from pinching the buffered fiber when the user pinches the clip 30 when decoupling the duplex connector from the adapter or receptacle.

The duplex clip 30 of the present invention also includes a trigger 47 that preferably is integrally molded with the clip 30. The trigger 47 has a catch 48 on opposite sides thereof that are generally directed downwards toward the upper surface 31 of the clip 30. The trigger also has markings 49 thereon that inform the user of the polarity of the optical fiber cables once the clip 30 has been clipped onto the connectors 20. As discussed below in detail with reference to FIG. 6, when the duplex connector is coupled to an adapter or receptacle, the catches 48—48 couple with the tangs 29A formed on the ends of the latches 29 (FIG. 3).

When the user wishes to decouple the duplex connector from the adapter or receptacle, the user depresses the trigger 47, which depresses the latches 29 of the simplex connectors 20 and pushes the bottom ends 29B of the latches 29 forward, thereby enabling the user to decouple the connectors 20 from the adapter or receptacle. When the user pulls the duplex connector away from adapter or receptacle, the catches 48 exert forces on the tang 29A that are directed in the direction in which the user is pulling the duplex connector. These forces ensure that the clip 30 will not be inadvertently decoupled from the simplex connectors 20 as the user decouples the duplex connector from the adapter or receptacle.

Figure 5:
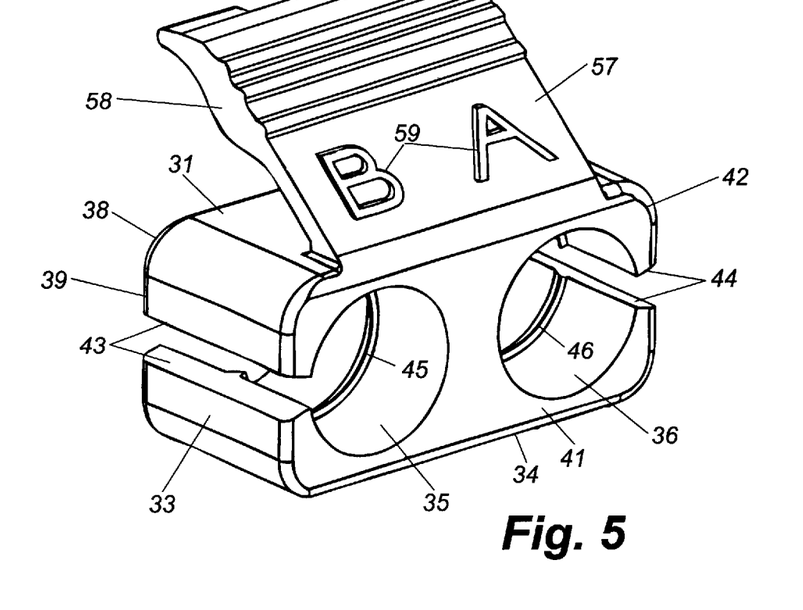
FIG. 5 is an elevated top, perspective view of the duplex clip of the present invention in accordance with another embodiment.

FIG. 5 is a perspective view of the duplex clip 30 of the present invention in accordance with an another embodiment. The duplex clip is substantially identical to that shown in FIGS. 4A and 4B except that the trigger shown in FIG. 5 is different from the trigger 47 shown in FIGS. 4A and 4B and the sides 32 and 33 of the clip shown in FIG. 5 and the overall shape of the clip body is somewhat rounded whereas the sides 32 and 33 of the clip 30 shown in FIGS. 4A and 4B are generally perpendicular to the top and bottom surfaces 31 and 34, respectively. In all other respects, the clip shown in FIG. 5 has all of the features of the clip shown in FIGS. 4A and 4B. Therefore, these common features will not be further discussed.

The trigger 57 shown in FIG. 5 also couples with the tangs 29A of the latches 29 of the connectors 20 when the duplex connector is coupled to an adapter or receptacle. However, the trigger 57 does not include the catches 48 that are formed on the end of the trigger 47. Therefore, the end of the trigger 57 that is in contact with the tangs 29A does not exert a pulling force on the tangs 29A when a user pulls the duplex connector from the adapter or receptacle. The trigger 57 performs all of the other functions that are performed by the trigger 47 in order to decouple the latches 29 from the adapter or receptacle. The trigger 57 also bears markings 59 that allow the user to connect the clip with the proper polarity. However, the trigger 57 includes a feature that the trigger 47 does not include. In particular, the trigger 57 includes a cam surface 58 that serves to accelerate the trigger 57 in the direction toward the top surface 31 of the clip 30 when the user depresses the trigger 57. This acceleration assists the trigger in depressing the latches 29 in order to decouple the latches 29 from the adapter or receptacle.

It should also be noted that the triggers 47 and 57 provide an additional advantage of functioning as anti-snag mechanisms by preventing the latches 29 of the simplex connectors 20 from fish-hooking adjacent cables when they are being removed. It should also be noted that various features of the trigger 47 could be used with the trigger 57, and vice versa. For example, the cm surface 58 of the trigger 57 could be used on the trigger 47. Similarly, the catches 48—48 could be used on the trigger 57.

Figure 6:
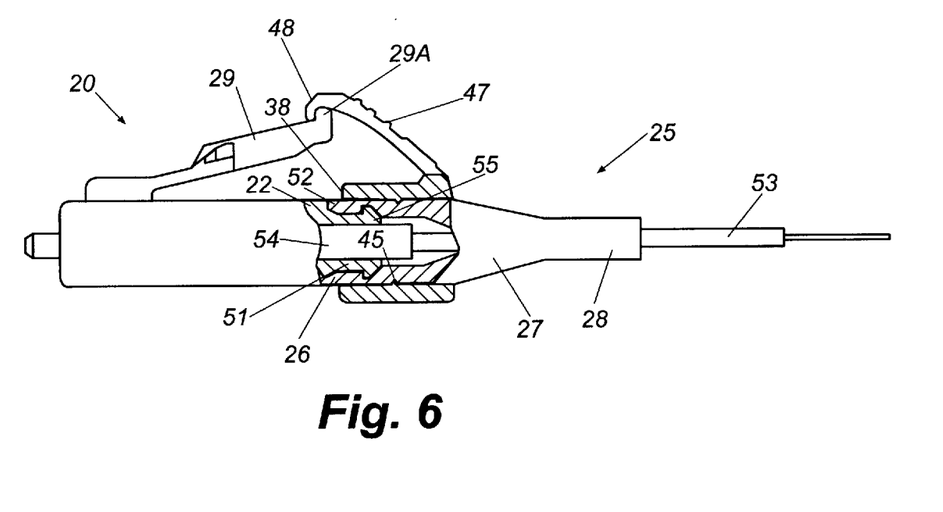
FIG. 6 is a side, partially cross-sectional, view of the connector shown in FIG. 3 disposed within the clip shown in FIGS. 4A and 4B.

FIG. 6 is a side, partially cross-sectional, view of the connector 20 shown in FIG. 3 having the duplex clip 30 of the present invention clipped thereto. The view shown in FIG. 6 clearly demonstrates the coupling of the catches 48—48 of the trigger 47 with the tangs 29A of the latches 29 of the connectors 20. The extender cap 22 of the connector 22 includes a rigid extension 51 that extends from the rear end 52 of the extender cap 22. This extension 51 is generally cylindrical and has an opening formed therein through which the buffered optical fiber cable 53 passes into the tube 54 of the ferrule assembly (not shown). The extension 51 has a circumferential ridge 55 on the end of it that snaps into a circumferential groove 56 defined in the inner surface of the portion 26 of the boot 25.

As shown in FIG. 6, the clip 30 grips about the wider portion 26 of the boot 25. When the clip 30 is fully in place, the forward end 39 of the clip 30 is disposed a small distance away from the rear end 52 of the extender cap 22. When the trigger 47 is depressed, thereby depressing the latch 29, the forward end, or plug end of the connector 20 will move forward slightly in the port of the adapter or receptacle as it decouples from the port. The small distance between the forward end 39 of the clip 30 and the rear end 52 of the extender cap 22 when the clip 30 is fully in place provides leeway to enable the clip 30 to move forward when the connector 20 moves forward as it decouples from the port.

FIG. 6 also demonstrates the manner in which the ridges 45/46 grip the boots 25. When the user pinches the clip when decoupling the duplex connector from an adapter or receptacle, the boot 25 will flex inwardly toward the buffered fiber. Signal loss could occur if the boot 25 were to pinch the buffered fiber. However, the location of the clip 30 on the boot 25 is such that when the clip 30 is pinched and the boot 25 flexes inwardly, the rigid extension 51 of the extender cap 22 prevents the boot 25 from pinching the buffered fiber. It should be noted that the duplex clip 30 does not have to be used with a pair of simplex connectors. The duplex clip 30 could also be used with a single simplex connector to provide the simplex connector with the ability to be easily decoupled from the adapter, to enable polarity of the simplex connector to be easily ascertained and to provide the connector with anti-snagging characteristics.

Figures 7, 8A:
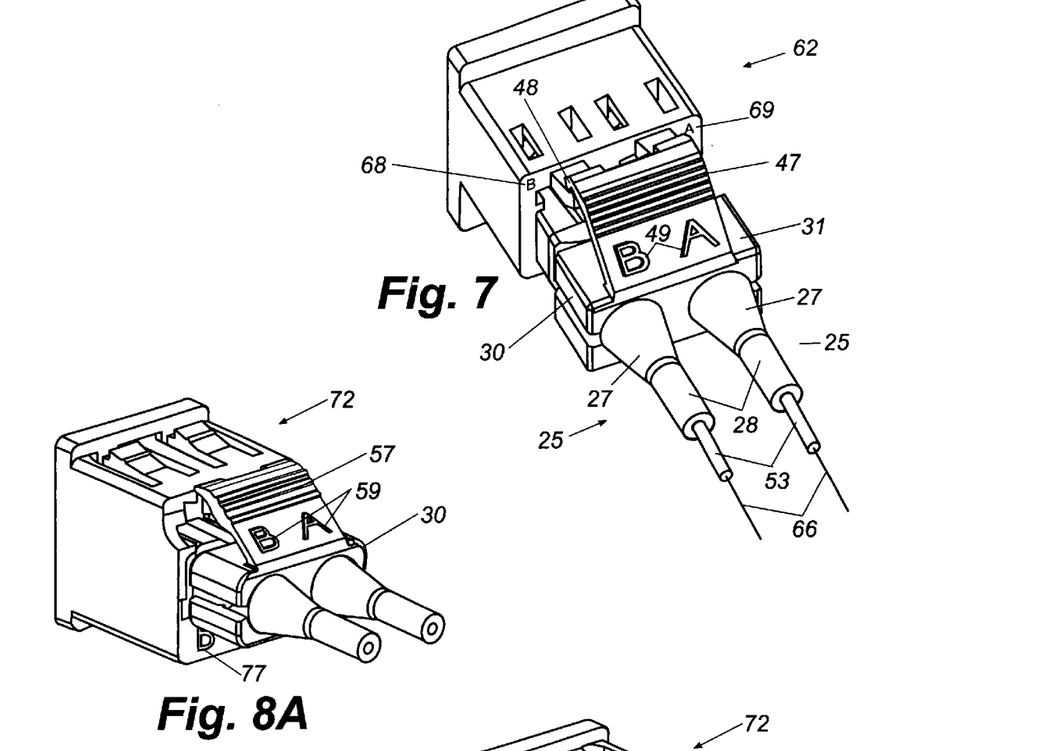
FIG. 7 is a top, perspective view illustrating the duplex clip of FIGS. 4A and 4B clipped to the boots of a pair of buffered optical fiber cables that are terminated by simplex connectors, which, in turn, are connected to the junior side of an adapter.
FIG. 8A is a side, perspective view illustrating the duplex clip of FIG. 5 clipped to the boots of a pair of buffered optical fiber cables that are terminated by simplex connectors, which, in turn, are connected to the junior side of a receptacle.

FIG. 7 is a perspective view the junior side of an adapter 62 connected to the duplex connector formed by clipping the duplex clip 30 of FIGS. 4A and 4B to the boots 25 of a pair of buffered optical fibers comprised of buffers 53 and fibers 66. The longer senior side of the adapter 62 is not shown in FIG. 7. Once the clip 30 of the present invention has been clipped to the boots 25 of the optical fiber cables 65, the duplex connector can be inserted into the adapter 62.

Alternatively, the duplex clip 30 may be clipped to the boots 25 after the simplex connectors have been fixured to the adapter 62. The junior side of the adapter 62 comprises two openings (not shown) that are adapted for receiving connectors of the type shown in FIG. 3.

The duplex connector of the present invention is shown connected to the junior side of the adapter 62 in order to demonstrate the preferred use of the duplex clip 30 of the present invention. The junior side of the adapter 62 corresponds to the BTW connection of the adapter 62. By connecting the boots 25 of the optical buffered fibers 53 to the duplex clip 30 of the present invention, a duplex connector is produced that is suitable for BTW connections. However, those skilled in the art will understand that the clip 30 of the present invention is not limited with respect to the location where it is used or with respect to the manner in which it is used, as will be understood by those skilled in the art. The clip 30 could be used, for example, with connectors coupled to the senior side (not shown) of the adapter 62.

The trigger 47 of the duplex clip 30 has markings (e.g., alphanumeric characters) 49 thereon that serve to identify the polarity of the optical fiber simplex connectors maintained in the duplex clip 30. The markings 49 identify the transmit and receive optical fiber cables, respectively, where A transmits and B receives. The adapter 62 that is utilized with the duplex clip 30 preferably will bear like markings 68 and 69 to indicate polarity. The A port on the junior side of the adapter 62 couples to the B port on the senior side (not shown) of the adapter 62, and the B port on the junior side of the adapter 62 couples to the A port on the senior side of the adapter 62. Therefore, when a person is connecting the duplex connector to the adapter 62, the person simply ensures that the simplex connectors below the letters A and B on the duplex clip 30 are inserted into the openings in the adapter 62 below the letters A and B, respectively, on the adapter 62.

It should be noted that although the clip 30 has been described as a duplex clip, the clip may be expanded to have more than two bores (not shown) so that more than two simplex connectors may be clipped together by the clip to form a multiplex (e.g., a quad) connector. Those skilled in the art will understand the manner in which the duplex clip discussed above can be modified and adapted to clip together more than two simplex connectors.

Figure 8B:
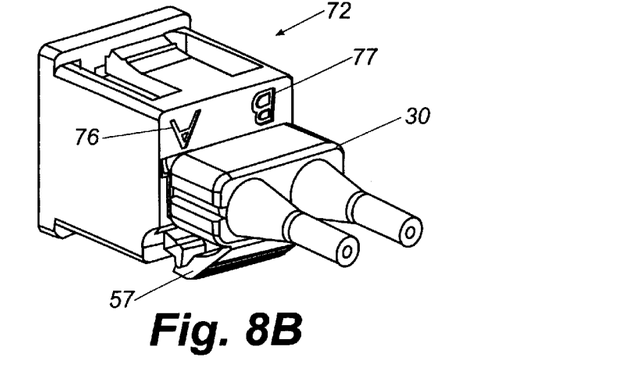
FIG. 8B is an inverted view of what is shown in FIG. 8A.

FIGS. 8A and 8B illustrate top and bottom perspective views, respectively, of the duplex clip 30 shown in FIG. 5, which has been clipped to two simplex connectors 20 to form a duplex connector, which, in turn, has been coupled to the ports of a receptacle 72. The coupling and decoupling of the duplex connector to and from the receptacle 72 is accomplished in the same manner in which the duplex connector of the present invention is coupled to and decoupled from the junior side of an adapter or receptacle. However, the receptacle 72 is slightly different from the adapter 62 with respect to the length of the receptacle and with respect to the locations of the markings that are used to indicate polarity. The receptacle 72 corresponds to what is commonly referred to as the senior side and is made longer to provide additional strength to the jumper connectors. As those skilled in the art will understand, adapters are typically formed by mating the junior and senior receptacles. Both receptacles are designed to accept both BTW and jumper connectors, but the longer senior side is typically used for receiving the jumper connectors and the shorter junior side is typically used for receiving BTW connectors. By attaching the duplex clip 30 to the boots 25 rather than to the housings of the connectors 20, the duplex clip 30 is capable of coupling two simplex connectors together in situations where the housings of the simplex connectors 20 are totally contained within the receptacle 72 (or within an adapter made with the senior receptacles) and therefore are not available for attachment to the duplex clip 30. The duplex connector of the present invention could also be coupled to the senior side (not shown) of the receptacle 72.

The markings 76 and 77 that indicate polarity are located on the receptacle 72 below the ports to which the connectors are coupled. Therefore, the top and bottom perspective views of FIGS. 8A and 8B have been presented to show the markings on both the trigger 57 and on the receptacle 72, because all of these markings cannot be fully seen in the top perspective view of FIG. 8B.

The present invention is not limited with respect to the type of adapter that is used to provide the connection with the duplex connector of the present invention. It should also be noted that the present invention is not limited with respect to the types of optical connectors that are used to terminate the optical fiber cables that are coupled together by the duplex clip 30 of the present invention. A suitable type of adapter for this purpose is the multi-mode, duplex adapter available from Lucent Technologies having Model No. C1001B-2, and the single-mode, duplex adapter also available from Lucent Technologies having Model No. C1101A-2. A suitable single-mode connector for terminating optical fiber cables coupled together by the duplex clip 30 of the present invention is available from Lucent Technologies and has Model No. P1101A-Z-125. Suitable connectors for multi-mode optical fiber cables that can be used with the duplex clip 30 of the present invention are also available from Lucent Technologies under Model Nos. P1001A-Z-125 and P1002-A-Z-125.

Figure 9:
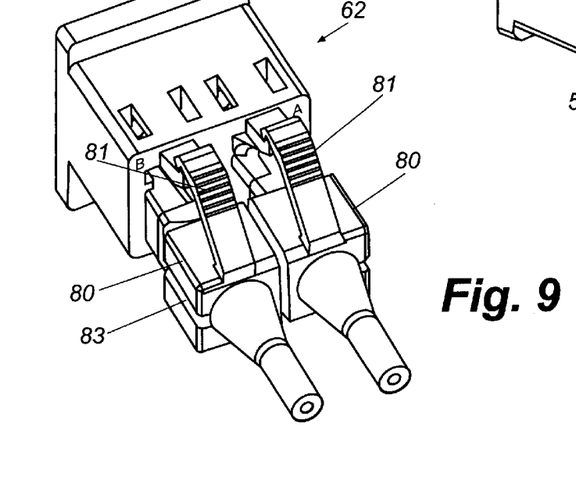
FIG. 9 is an elevated top, perspective view illustrating the clip of the present invention in accordance with another embodiment wherein the clip is clipped onto a single optical fiber connector.

FIG. 9 illustrates the clip of the present invention in accordance with an alternative embodiment wherein the clip is configured as a simplex clip to clip onto a single simplex optical fiber connector. Two simplex clips 80 are shown in FIG. 9 connected to the junior side of the adapter 62. Each of clips 80 has a trigger 81 thereon that preferably is similar to the trigger 47 having the catch 48 thereon shown in FIGS. 6 and 7 and discussed above in detail. Therefore, the operations of the trigger 81 in relation to the latch 29 of the simplex connector is identical to that discussed above with reference to FIGS. 6 and 7. The trigger 81 could also have the form of the trigger 57 shown in FIG. 5. The clip 80 is very similar in design to the duplex clip 30 discussed above with reference to FIGS. 4A and 4B except that the clip 80 is adapted to clip onto one, rather than two or more, simplex connectors.

Each of the simplex clips 80 preferably has a slot 83 formed in a side thereof, which preferably is identical to the slots 43—43 and 44—44 discussed above with reference to FIGS. 4A and 4B. The bore formed in the clip 80 preferably is identical to the bores 35 and 36 discussed above with reference to FIGS. 4A and 4B. Therefore, the manner in which the bores of the clips 80 grip the boots 25 of the buffered fibers is identical to that discussed above with reference to FIGS. 4A, 4B and 6.

There are several advantages to using the simplex clip 80 with a simplex connector. One of the advantages is that the trigger 81 enables a user to easily decouple the simplex connector from an adapter or receptacle, as discussed above in detail. Another advantage of the clip 80 is that it can be easily clipped to a simplex connector even after the simplex connector has been inserted into an adapter or receptacle. In this respect, the clip 80 is installed in the same manner in which the duplex clip 30 is installed, i.e., by sliding the buffered fiber through the slot 83 formed in the side of the clip 80 and by pushing the clip forward toward the adapter until the boot 25 is tightly gripped by the bore of the clip 80. Another advantage of the trigger 81 is that, once the clip 80 has been clipped onto a simplex connector, the trigger 81 provides an anti-snagging feature that enables the optical fiber cable terminated with the simplex connector and having the clip 80 clipped thereto to be pulled through confined areas without snagging.

It should be noted that although the slot 83 is shown as being formed in the side of the clip 80, the clip 80 could instead have a slot (not shown) formed in the bottom surface thereof. It will also be understood by those skilled in the art that the present invention is not limited with respect to the type of material that is utilized to fabricate the simplex or duplex clip of the present invention. A variety of materials are suitable for this purpose. Preferably, the material that is utilized to create the duplex clip of the present invention is Vestamid L1670, which is nylon. The duplex clip also is not limited with respect to its dimensions. As will be understood by those skilled in the art, the dimensions of the clip generally will depend on the dimensions of the plugs of the optical fiber cables with which the duplex clip is intended to be used.

It will also be understood by those skilled in the art that the present invention is not limited with respect to the number of connectors that are held together by the clip. A variety of clips could be made to accommodate, for example, an eight-port array, or a one-port-by-one-port array where the triggers would oppose one another, a two-port-by-two-port array, etc. As will be understood by those skilled in the art, the dimensions of the clip generally will depend on the number of connectors that are intended to be held by the clip.

What is claimed is:

1. A duplex clip for holding a pair of simplex connectors together to form a duplex connector, each simplex connector comprising a generally rectangular housing having a plug end for insertion into a mating receptacle or adapter and a cable entrance end for receiving a cable containing a transmission medium, the housing having a flexible latch disposed on an upper surface thereof to enable the simplex connector to be coupled to and decoupled from an adapter or receptacle, the latch having a first end attached to the upper surface of the housing and a second end disposed above the upper surface of the housing, each simplex connector also having a boot attached at a first end of the boot about the cable entrance end and at a second end of the boot to the cable, the boot having an opening formed therein, the cable passing through the opening formed in the boot and into the cable entrance end of the housing, the clip comprising:

a clip body, the clip body being adapted to receive and grip outer surfaces of the boots of a pair of simplex connectors to hold the simplex connectors in close spatial proximity to one another to thereby form a duplex connector, the clip body having a flexible trigger disposed on a top surface of the clip body, the trigger having a first end and a second end, the first end of the trigger being secured to the top surface of the housing, the second end of the trigger being adapted to couple with the second end of the latch when the duplex clip is clipped to the simplex connectors.

2. The duplex clip of claim 1, wherein the clip body has two openings formed therein, each of the openings having an inner surface adapted to receive and grip the boot of a simplex connector, each opening receiving the boot of one of the simplex connectors and gripping the boot received therein such that the pair of simplex connectors is held together.

3. The duplex clip of claim 2, wherein the openings formed in the clip body are generally cylindrical bores formed in the clip body, the inner surface of each of the bores having a circumferential ridge formed thereon, the circumferential ridge being located between a first portion of the inner surface of the bore and a second portion of the inner surface of the bore, the clip body having a forward end and a rear end, wherein when the boots are disposed within the bores, the forward end of the clip body is closer to the plug ends of the simplex connectors than the rear end of the clip body is to the plug ends, and wherein the first portion of the inner surface generally extends from the forward end of the clip body to the circumferential ridge, the second portion of the inner surface generally extending from the circumferential ridge to the rear end of the clip body, the first and second portions of the inner surfaces of the bores having diameters that are substantially equal, the circumferential ridges having a diameter that is less than the diameters of the first and second portions.

4. The duplex clip of claim 3, wherein the clip body is generally rectangular in shape and includes a first side, a second side, a third side, a fourth side, a fifth side and a sixth side, the first and second sides corresponding to the forward and rear ends, respectively, of the clip body, the third and fourth sides corresponding to top and bottom surfaces, respectively, of the clip body, the fifth and sixth sides being generally perpendicular to the first, second, third and fourth sides, wherein the fifth and sixth sides are generally parallel to each other and located at opposite side ends of the clip body, each of the bores having an axis that extends from the first side to the second side of the clip body, the axes of the bores being parallel to one another, the fifth and sixth sides each having a slot formed therein that is parallel to the axes of the bores and that extends from the first side to the second side of the clip body, each of the slots forming an opening in one of the bores, thereby providing the bores with generally C-shaped cross-sections, the slots allowing the clip body to be deformed when a force is exerted on the top and bottom surfaces such that the diameters of the first and second portions of the inner surfaces of the bores and the diameter of the circumferential ridges of the bores are slightly decreased, thereby causing the bores to more tightly grip the boots disposed therein, the slots having a width that is greater than the diameter of the cable to allow the cables to be passed through the slots and into the bores.

5. The duplex clip of claim 4, wherein the first and second portions of the inner surfaces of the bores meet the circumferential ridges formed on the inner surfaces of the bores approximately mid-span of the bores with respect to the axial directions of the bores.

6. The duplex clip of claim 4, wherein each of the simplex connector housings comprises an extender cap, the extender cap having an extension thereon that extends a certain distance within the boot, the extension having an opening formed therein that defines the cable entrance end of the connector housing, each boot having an inner surface that is attached about the extension to form the attachment of the boot to the cable entrance end of the housing, the first portions of the inner surfaces of the bores being in contact with the outer surfaces of the boot at locations on the outer surfaces of the boots above the extensions.

7. The duplex clip of claim 5, wherein the trigger has markings thereon that enable a person to ascertain a polarity of the connectors associated with the boots disposed in the bores.

8. The duplex clip of claim 1, wherein the second end of the trigger has a catch mechanism formed thereon and wherein the second end of the latch has a tang formed thereon, and wherein when the duplex clip is clipped to a pair of simplex connectors and a force is exerted on the duplex clip in the axial direction of the bores away from the plug end of the connector housing, the catch mechanism on the second end of the trigger interlocks with the tangs on the second ends of the latches to thereby prevent the duplex clip and the simplex connectors from being separated from each other.

9. A duplex connector for connecting two cables to an adapter or receptacle, the duplex connector comprising:
   a pair of simplex connectors, each simplex connector terminating a cable containing a transmission medium, each simplex connector comprising a generally rectangular housing having a plug end for insertion into a mating receptacle or adapter, a cable entrance end for receiving a cable containing a transmission medium, and a boot attached at a first end of the boot about the cable entrance end and at a second end of the boot to the cable, the housing having a flexible latch disposed on an upper surface thereof to enable the simplex connector to be coupled to and decoupled from an adapter or receptacle, the latch having a first end attached to the upper surface of the housing and a second end disposed above the upper surface of the housing, and wherein the boot has an opening formed therein, the cable passing through the opening formed in the boot and into the cable entrance end of the housing; and
   a clip body, the clip body being adapted to receive and grip outer surfaces of the boots of a pair of simplex connectors to hold the simplex connectors in close spatial proximity to one another to thereby form the duplex connector, the clip body having a flexible trigger disposed on a top surface of the clip body, the trigger having a first end and a second end, the first end of the trigger being secured to the top surface of the clip body, the second end of the trigger being adapted to couple with the second end of the latch when the duplex clip is clipped to the simplex connectors.

10. The duplex connector of claim 9, wherein the clip body has two openings formed therein, each of the openings having an inner surface adapted to receive and grip the boot of a simplex connector, each opening receiving the boot of one of the simplex connectors and gripping the boot received therein such that the pair of simplex connectors is held together.

11. The duplex connector of claim 10, wherein the openings formed in the clip body are generally cylindrical bores formed in the clip body, the inner surface of each of the bores having a circumferential ridge formed thereon, the circumferential ridge being located between a first portion of the inner surface of the bore and a second portion of the inner surface of the bore, the clip body having a forward end and a rear end, wherein when the boots are disposed within the bores, the forward end of the clip body is closer to the plug ends of the simplex connectors than the rear end of the clip body is to the plug ends, and wherein the first portion of the inner surface generally extends from the forward end of the clip body to the circumferential ridge, the second portion of the inner surface generally extending from the circumferential ridge to the rear end of the clip body, the first and second portions of the inner surfaces of the bores having diameters that are substantially equal, the circumferential ridges having a diameter that is less than the diameters of the first and second portions.

12. The duplex connector of claim 9, wherein the trigger of the duplex clip has markings thereon that enable a person to ascertain a polarity of the connectors associated with the boots disposed in the bores and wherein the adapter or receptacle has markings thereon that enable the user to match the polarity of the connectors with a polarity of the adapter or receptacle.

13. The duplex clip of claim 10, wherein the clip body is generally rectangular in shape and includes a first side, a second side, a third side, a fourth side, a fifth side and a sixth side, the first and second sides corresponding to the forward and rear ends, respectively, of the clip body, the third side corresponding to the top surface of the clip body, the fourth side corresponding to a bottom surface of the clip body, the fifth and sixth sides being generally perpendicular to the first, second, third and fourth sides, the fifth and sixth sides being generally parallel to each other and located at opposite side ends of the clip body, each of the bores having an axis that extends from the first side to the second side of the clip body, the axes of the bores being parallel to one another, the fifth and sixth sides each having a slot formed therein that is parallel to the axes of the bores and that extends from the first side to the second side of the clip body, each of the slots forming an opening in one of the bores, thereby providing the bores with generally "C"-shaped cross-sections, the slots allowing the clip body to be deformed when a force is exerted on the top and bottom surfaces such that the diameters of the first and second portions of the inner surfaces of the bores and the diameter of the circumferential ridges of the bores are slightly decreased, thereby causing the bores to more tightly grip the boots disposed therein, the slots having a width that is greater than the diameter of the cable to allow the cables to be passed through the slots and into the bores.

14. A clip adapted to be attached to a simplex connector, the simplex connector comprising a generally rectangular housing having a plug end for insertion into a mating receptacle or adapter, a cable entrance end for receiving a cable containing a transmission medium, and a boot attached at a first end of the boot about the cable entrance end and at a second end of the boot to the cable, the housing having a flexible latch disposed on an upper surface thereof to enable the simplex connector to be coupled to and decoupled from an adapter or receptacle, the latch having a first end attached to the upper surface of the housing and a second end disposed above the upper surface of the housing, the boot having an opening formed therein, the cable passing through the opening formed in the boot and into the cable entrance end of the housing, the clip comprising:
   a clip body, the clip body being adapted to receive and grip an outer surface of the boot of a simplex connector, the clip body having a flexible trigger disposed on a top surface of the clip body, the trigger having a first end and a second end, the first end of the trigger being secured to the top surface of the clip body, the second end of the trigger being adapted to couple with the second end of the latch when the clip is attached to the simplex connector, the trigger providing the simplex connector with an anti-snagging mechanism that prevents the latch of the simplex connector from hooking onto objects when the simplex connector is being moved.

15. The clip of claim 14, wherein the clip body has an opening formed therein, the opening having an inner surface adapted to receive and grip the boot of a simplex connector, the opening receiving the boot of the simplex connector and gripping the boot received therein.

16. The clip of claim 15, wherein the opening formed in the clip body is a generally cylindrical bore formed in the clip body, the inner surface of the bore having a circumferential ridge formed thereon, the circumferential ridge being located between a first portion of the inner surface of the bore and a second portion of the inner surface of the bore, the clip body having a forward end and a rear end, wherein when the boot is disposed within the bore, the forward end of the clip body is closer to the plug end of the simplex connector than the rear end of the clip body is to the plug end, and wherein the first portion of the inner surface generally extends from the forward end of the clip body to the circumferential ridge, the second portion of the inner surface generally extending from the circumferential ridge to the rear end of the clip body, the first and second portions of the inner surface of the bore having diameters that are substantially equal, the circumferential ridge having a diameter that is less than the diameter of the first and second portions.

17. The clip of claim 16, wherein the clip body is generally rectangular in shape and includes a first side, a second side, a third side, a fourth side, a fifth side and a sixth side, the first and second sides corresponding to the forward and rear ends, respectively, of the clip body, the third side corresponding to the top surface of the clip body, the fourth side corresponding to a bottom surface of the clip body, the fifth and sixth sides being generally perpendicular to the first, second, third and fourth sides, wherein the fifth and sixth sides are generally parallel to each other and located at opposite side ends of the clip body, the bore having an axis that extends from the first side to the second side of the clip body, the fifth side having a slot formed therein that is parallel to the axis of the bore and that extends from the first side to the second side of the clip body, the slot forming an opening in the bore that provides the bore with a generally C-shaped cross-section, the slot allowing the clip body to be deformed when a force is exerted on the top and bottom surfaces such that the diameters of the first and second portions of the inner surface of the bore and the diameter of the circumferential ridge of the bore are slightly decreased, thereby causing the bore more tightly grips the boot disposed therein, the slot having a width that is greater than the diameter of the cable to allow the cable to be passed through the slot and into the bore.

18. The clip of claim 16, wherein the clip body is generally rectangular in shape and includes a first side, a second side, a third side, a fourth side, a fifth side and a sixth side, the first and second sides corresponding to the forward and rear ends, respectively, of the clip body, the third side corresponding to the top surface of the clip body, the fourth side corresponding to a bottom surface of the clip body, the fifth and sixth sides being generally perpendicular to the first, second, third and fourth sides, wherein the fifth and sixth sides are generally parallel to each other and located at opposite side ends of the clip body, the bore having an axis that extends from the first side to the second side of the clip body, the fourth side having a slot formed therein that is parallel to the axis of the bore and that extends from the first side to the second side of the clip body, the slot forming an opening in the bore that provides the bore with a generally C-shaped cross-section, the slot having a width that is greater than the diameter of the cable to allow the cable to be passed through the slot and into the bore.

* * * * *